(12) United States Patent
Mohsenian

(10) Patent No.: US 7,920,633 B2
(45) Date of Patent: Apr. 5, 2011

(54) METHOD AND SYSTEM FOR PARALLEL PROCESSING VIDEO DATA

(75) Inventor: Nader Mohsenian, Lawrence, MA (US)

(73) Assignee: Broadcom Corporation, Irvine, CA (US)

( * ) Notice: Subject to any disclaimer, the term of this patent is extended or adjusted under 35 U.S.C. 154(b) by 1748 days.

(21) Appl. No.: 11/112,628

(22) Filed: Apr. 22, 2005

(65) Prior Publication Data

US 2006/0239343 A1     Oct. 26, 2006

(51) Int. Cl.
*H04N 7/18* (2006.01)
(52) U.S. Cl. .................. 375/240.26; 348/721
(58) Field of Classification Search .......... 375/240.11–240.29; 348/715–725
See application file for complete search history.

(56) References Cited

U.S. PATENT DOCUMENTS 5,986,712 A * 11/1999 Peterson et al. ......... 375/240.14

* cited by examiner

*Primary Examiner* — Andy S Rao
(74) *Attorney, Agent, or Firm* — McAndrews, Held & Malloy, Ltd.

(57) ABSTRACT

Described herein is a method and system for parallel processing video data. The system having parallel encoder devices can create a balance between quality of service and delay. In order to maintain quality, compression parameters in a group of pictures can be produced by one encoder device and used by another encoder device for estimation during the encoding of another group of pictures. Compression parameters of different picture types may be stored separately and used for the encoding of a future pictures of the same type. The generation and passing of compression parameters introduces a delay based on the time it takes to encode one or more pictures.

22 Claims, 5 Drawing Sheets

300

301 — Utilize a first encoder device to generate a first set of compression parameters for a first group of pictures 303 — Utilize a second encoder device to generate a second set of compression parameters for a second group of pictures 305 — Utilize a third encoder device to encode a third group of pictures based on at least one of the first set of compression parameters and the second set of compression parameters

501 — Generate a first set of compression parameters for a first group of pictures 503 — Generate a second set of compression parameters for a second group of pictures simultaneously with the generation of the first set of compression parameters 505 — Encode a third group of pictures based on the first set of compression parameters that are passed forward, wherein the first set of compression parameters comprises a number of picture bits in an I picture that appears in display order prior to the third group of pictures 507 — Encode a third group of pictures based on the second set of compression parameters that are passed backward, wherein the second set of compression parameters comprises a number of picture bits in an I picture that appears in display order after to the third group of pictures

*Figure 5*

METHOD AND SYSTEM FOR PARALLEL PROCESSING VIDEO DATA

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Video encoders can be very computationally intense devices. They may be responsible for determining a large set of spatial and temporal descriptors from which the best candidates are selected for final encoding. The best candidate selection is based on the premise that the source video signal must be transformed to fit within a communication channel or storage media while maintaining a certain level of quality. Sometimes multiple candidates are chosen during sub-level encoding. For example, macroblock encoding may be carried out multiple times to achieve best output quality. The complete encoding cycle may be repeated, and filtering may be added to optimize video quality.

Hardware and/or software scaling can be performed to reduce the number of compute cycles. For applications where scaling creates an unacceptable quality degradation, parallel processing can be adopted. The degree to which this parallelism is carried out can depend on specific application requirements.

Although parallel processing speeds up the encoding task, certain strategies may be required to improve quality.

Limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Described herein are system(s) and method(s) for parallel processing video data, substantially as shown in and/or described in connection with at least one of the figures, as set forth more completely in the claims.

These and other advantages and novel features of the present invention will be more fully understood from the following description.

BRIEF DESCRIPTION OF THE DRAWINGS

FIG. 3 is a flow diagram of an exemplary method for parallel processing video data in accordance with an embodiment of the present invention;

FIG. 5 is a flow diagram of another exemplary method for parallel processing video data in accordance with an embodiment of the present invention.

DETAILED DESCRIPTION OF THE INVENTION

According to certain aspects of the present invention, a system and method are presented for parallel processing. Pictures in a video sequence can be partitioned into a group of pictures (GOP). A GOP is typically one second or less in duration. In order to maintain a bit-rate during GOP encoding, compression parameters such as a number of picture bits (Ta) and picture quantization scale (Qa) can be produced by an encoder device and used as estimates for the encoding of a future picture. Compression parameters of different picture types may be stored separately and used for the encoding of a future picture of the same type.

The amount of encoding time it takes to compress a video sequence of M GOPs can be defined as ET. Ideally if N encoder devices are used and started simultaneously, the amount of time it takes to encode M GOPs can be (ET/N). However, the output created by a system with N encoder devices may not have the same quality as a system that uses a single encoder device. The quality difference can be due to artificial seams that are created where the N encoder devices begin processing. When compression parameters from previous pictures are not available, an open-loop seam may occur that impacts quality. By transferring compression parameters such as a number of picture bits or a picture quantizer scale, a parameter estimation loop can be closed.

To allow compression parameters to be transferred in the system with N encoder devices, a processing delay is added. The encoding time for a video sequence of M GOPs using N encoder devices would be (ET/N+D) where D is a delay associated with the time it takes to encode one or more pictures. The parameter D in inversely related to number of artificial seams that may occur. When delay D is zero, all N encoder devices start at the same time and there may be (N−1) instances where compression parameters are not transferred for the encoding of future pictures. It should be noted that a greater architectural advantage is achieved when the number of GOPs (M) in video sequence is larger than the number of encoder devices (N).

There is a tradeoff between system delay D and quality degradation due to open-loop seams. A bounded quality degradation can be used to compute a fixed allowable delay D. For the case of zero open-loop seams per N devices, the delay D is (N−1), and the encoding time is ET/N+(N−1).

Figure 1:
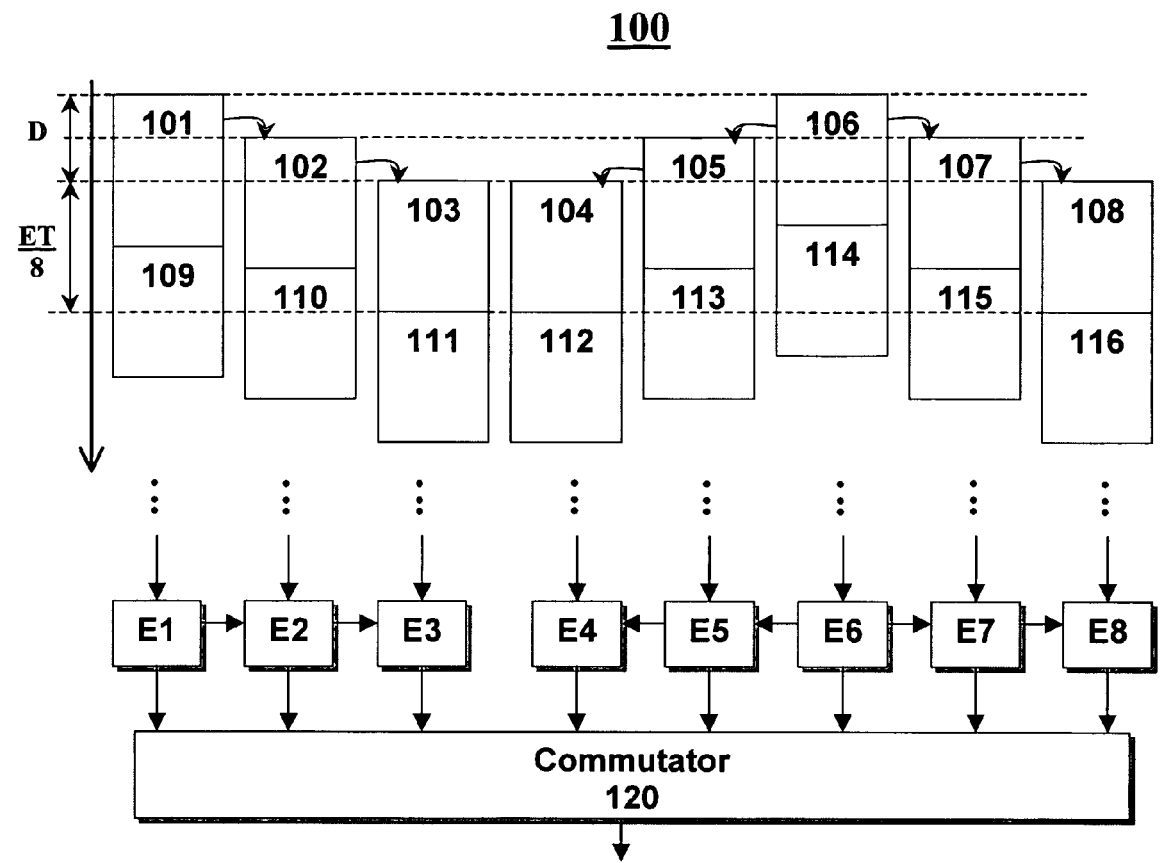
FIG. 1 is a block diagram of a first exemplary system for parallel processing video data in accordance with an embodiment of the present invention.

FIG. 1 depicts a first exemplary system 100 comprising 8 encoder devices in accordance with an embodiment of the present invention. For the case of one open-loop seam per N devices, the delay D can be derived from following formula:

$$D = \max[N-\alpha, \text{Ceiling}((\alpha-2)/2)]$$

$$\alpha = \text{Floor}((2 \times (N+1))/3)$$

The ceiling function Ceiling(y) outputs the smallest integer number larger than y, and floor function Floor(z) outputs the largest integer number smaller than z.

For a compression system comprised of eight encoder devices E1-E8, one open-loop seam at 106 is created during the encoding of GOPs 101-108, and one open-loop seam at 114 is created during the encoding of GOPs 109-116. This configuration can be accomplished by a delay D=2.

A commutator 120 can reorder the outputs of the encoder devices E1-E8 for transmission or storage in the system 100.

Figure 2:
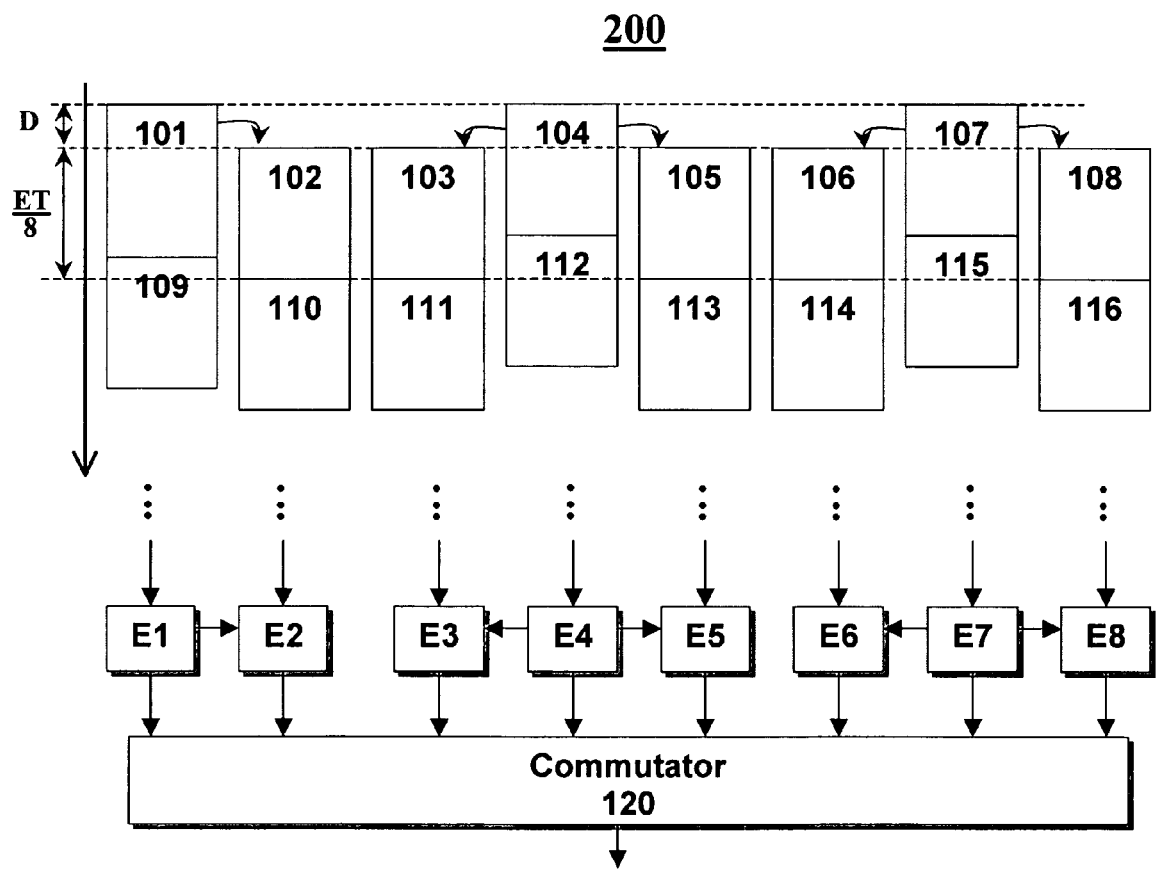
FIG. 2 is a block diagram of a second exemplary system for parallel processing video data in accordance with an embodiment of the present invention.

FIG. 2 depicts a second exemplary system 200 comprising of 8 encoder devices in accordance with an embodiment of the present invention. For a delay D=1, the number of open loop seams (OL) per N GOPs is derived from the following set of equations:

$$OL = S_0 + S_1 + R_1$$

With, $$S_0 = \text{Floor}((N-1)/3)$$

$$S_1 = \text{Floor}((R_1-1)/2)$$

$$R_1 = (R_0-1) - 2 \times S_1$$

$$R_0 = (N-1) - 3 \times S_0$$

A minimum delay of D=1 can be achieved in a system with 8 encoder devices E1-E8 and 2 open-loop seams per 8 GOPs. The delay D=1 is the time it takes for compression parameters to be generated in one encoding device and passed to another encoding device. The delay D may be associated with the time it takes to encode one or more pictures. The compression parameters may be associated with one or more pictures. In 200, a phase 1 begins with the simultaneous encoding of GOPs 101, 104, and 107 by encoder devices E1, E4, and E7 respectively. A phase 2 begins after a delay (D=1). Encoder devices E2, E3, E5, E6, and E8 encode GOPs 102, 103, 105, 106, and 108 respectively. The delay ensures that the first pictures of GOPs 101, 104, and 107 are ready in compressed form prior to phase 2, and their statistical parameters can be used to estimate new compression parameters for the first pictures of phase 2 GOPs 102, 103, 105, 106, and 108. Specifically, the first picture of GOP 102 can be estimated from the first picture of GOP 101 in forward mode, the first picture of GOP 103 can be estimated from the first picture of GOP 104 in backward mode, the first picture of GOP 105 can be estimated from the first picture of GOP 104 in forward mode, the first picture of GOP 106 can be estimated from the first picture of GOP 107 in backward mode, and the first picture of GOP 108 can be estimated from the first picture of GOP 107 in forward mode. In this case the first pictures of GOPs 104 and 107 are processed in open-loop fashion. GOPs 101-108 are run on encoder devices E1-E8 respectively. The first picture of any video sequence (e.g. the first picture of GOP 101) is also started in open-loop mode.

A commutator 120 can reorder the outputs of the encoder devices E1-E8 for transmission or storage in the system 200.

The multi-encoder system 200 is presented where the input sequence is partitioned into multiple GOP phases. Each GOP phase is associated with an encoding delay such that the first GOP phase has zero delay, followed by a second GOP phase started after a delay. The delay can be equal to encoding one or more picture in the first phase. Additional GOP phases may also be included after another delay. Each GOP phase is comprised of non-contiguous GOPs that may be generated by sub-sampling the said input sequence in GOP resolution and in a non-uniform fashion. The choice of the number of non-contiguous GOPs in first phase and the nominal value of the delay determine the number of open-loop seams in the output stream.

In order to minimize delay and the number of open-loop seams, it is important to sub-sample the pre-defined N GOPs such that the first phase contains GOPs that can be used in both forward and backward estimation modes for future phases. This concept can be extended if there are multiple phases in the sequence. For example in FIG. 2 with N=8 encoder devices, the phase one is comprised of GOPs 101, 104, and 107 and the phase two is comprised of GOPs 102, 103, 105, 106, and 108. Selecting GOPs 101, 102, and 107 for phase one can create additional open-loop seams since GOP 102 cannot be utilized in bi-directional estimation mode in the way GOP 104 can be used.

For a compression system based on N encoder devices, and a desired delay D (other than zero), the number of open-loop seams OL (and therefore, a measure of quality) can be approximated from the following formula:

$$OL = (\Sigma S_i) + R_D \quad i=0, 1, \ldots, D$$

With, $$S_0 = \text{Floor}((N-1)/(2+D))$$

$$R_0 = (N-1) - (2+D) \times S_0$$

$$S_i = \text{Floor}((R_{i-1}-1)/(2+D-i))$$

$$R_i = (R_{i-1}-1) - (2+D-i) \times S_i$$

For N=16 the following OL and D combinations are possible:

| OL | D |
|----|---|
| 5  | 1 |
| 4  | 2 |
| 3  | 3 |

By selecting several values of delay D, a range of open loop seams OL can be pre-computed, and consequently for a target value of OL, the corresponding D can be known a priori. Therefore, a measure of quality of service and/or system delay is readily available.

A multi-encoding system based on parallelizing encoder devices can balance quality of service (associated with number of open-loop seams) and delay. This balance can be determined according to the equations described above.

FIG. 3 is a flow diagram 300 of an exemplary method for parallel processing video data in accordance with an embodiment of the present invention. Pictures in a video sequence can be partitioned into a group of pictures (GOP). A GOP is typically one second or less in duration. In order to maintain a bit-rate during GOP encoding, compression parameters such as a number of picture bits (Ta) and picture quantization scale (Qa) can be produced by an encoder device and used as estimates for the encoding of a future picture. Compression parameters of different picture types may be stored separately and used for the encoding of a future picture of the same type.

The amount of encoding time it takes to compress a video sequence can be decreased if more than one encoder device is used. The output created by a system with parallel encoder devices may not have the same quality as a system that uses a single encoder device as a result of artificial seams that are created where the encoder devices begin processing. When compression parameters from previous pictures are not available, an open-loop seam may occur that impacts quality.

An example parallel system may have at least three encoder devices that can process different groups of pictures. At 301, a first encoder device is utilized to generate a first set of compression parameters for a first group of pictures, and at 303, a second encoder device is utilized to generate a second set of compression parameters for a second group of pictures.

The first encoder device and the second encoder device can be run in parallel and started simultaneously.

Following the simultaneous parameter generation at 301 and 303, a third encoder device is utilized at 305 to encode a third group of pictures based on at least one of the first set of compression parameters and the second set of compression parameters. By transferring compression parameters such as a number of picture bits or a picture quantizer scale to the third encoder device based on the first and/or second group of picture, a parameter estimation loop can be closed to improve quality.

This invention can be applied to video data encoded with a wide variety of standards, one of which is H.264. An overview of H.264 will now be given. A description of an exemplary system for scene change detection in H.264 will also be given.

H.264 Video Coding Standard

The ITU-T Video Coding Experts Group (VCEG) and the ISO/IEC Moving Picture Experts Group (MPEG) drafted a video coding standard titled ITU-T Recommendation H.264 and ISO/IEC MPEG-4 Advanced Video Coding, which is incorporated herein by reference for all purposes. In the H.264 standard, video is encoded on a macroblock-by-macroblock basis.

By using the H.264 compression standard, video can be compressed while preserving image quality through a combination of spatial, temporal, and spectral compression techniques. To achieve a given Quality of Service (QoS) within a small data bandwidth, video compression systems exploit the redundancies in video sources to de-correlate spatial, temporal, and spectral sample dependencies. Statistical redundancies that remain embedded in the video stream are distinguished through higher order correlations via entropy coders. Advanced entropy coders can take advantage of context modeling to adapt to changes in the source and achieve better compaction.

An H.264 encoder can generate three types of coded pictures: Intra-coded (I), Predictive (P), and Bidirectional (B) pictures. Each macroblock in an I picture is encoded independently of other pictures based on a transformation, quantization, and entropy coding. I pictures are referenced during the encoding of other picture types and are coded with the least amount of compression. Each macroblock in a P picture includes motion compensation with respect to another picture. Each macroblock in a B picture is interpolated and uses two reference pictures. The picture type I uses the exploitation of spatial redundancies while types P and B use exploitations of both spatial and temporal redundancies. Typically, I pictures require more bits than P pictures, and P pictures require more bits than B pictures.

Figure 4:
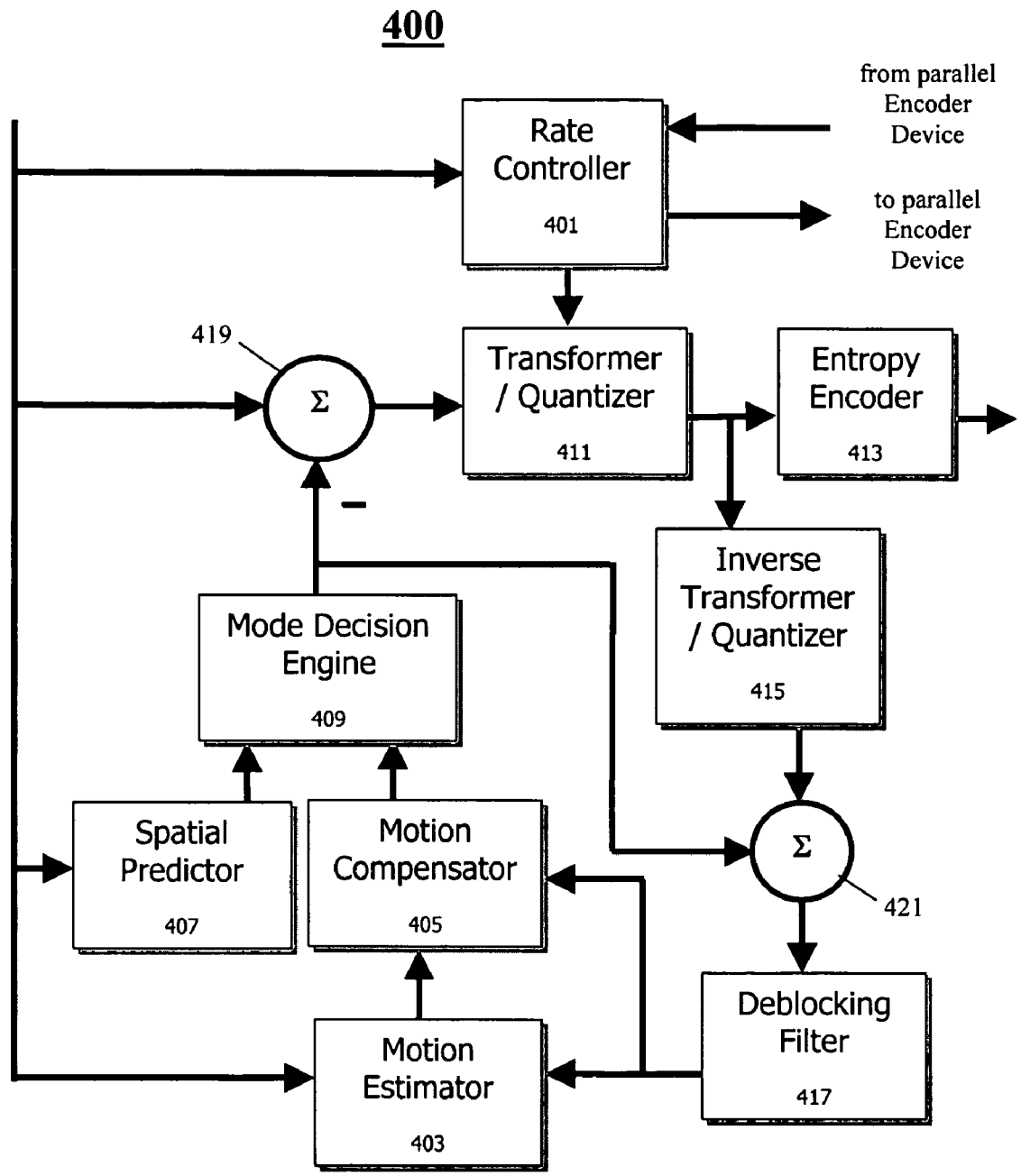
FIG. 4 is a block diagram of an exemplary video encoding system that comprises compression parameter generation in accordance with an embodiment of the present invention.

Referring now to FIG. 4, there is illustrated a block diagram of an exemplary video encoder 400. The video encoder 400 comprises a rate controller 401, a motion estimator 403, a motion compensator 405, a spatial predictor 407, a mode decision engine 409, a transformer/quantizer 411, an entropy encoder 413, an inverse transformer/quantizer 415, and a deblocking filter 417.

The spatial predictor 407 uses the contents of a current picture for prediction. Spatially predicted partitions are intra-coded. Luma macroblocks can be divided into 4×4 or 16×16 partitions and chroma macroblocks can be divided into 8×8 partitions. 16×16 and 8×8 partitions each have 4 possible prediction modes, and 4×4 partitions have 9 possible prediction modes.

The motion estimator 403 generates motion vector that predicts the partitions in the current picture from reference partitions out of the deblocking filter 417. A temporally encoded macroblock can be divided into 16×8, 8×16, 8×8, 4×8, 8×4, or 4×4 partitions. Each partition of a 16×16 macroblock is compared to one or more prediction blocks in previously encoded picture that may be temporally located before or after the current picture.

The motion compensator 405 receives the motion vectors from the motion estimator 403 and generates a temporal prediction. Motion compensation runs along with the main encoding loop to allow intra-prediction macroblock pipelining.

The mode decision engine 409 will receive the spatial prediction and temporal prediction and select the prediction mode according to a sum of absolute transformed difference (SATD) cost that optimizes rate and distortion. A selected prediction is output.

Once the mode is selected, a corresponding prediction error is the difference 419 between the current picture and the selected prediction. The transformer/quantizer 411 transforms the prediction error and produces quantized transform coefficients.

Transformation in H.264 utilizes Adaptive Block-size Transforms (ABT). The block size used for transform coding of the prediction error corresponds to the block size used for prediction. The prediction error is transformed independently of the block mode by means of a low-complexity 4×4 matrix that together with an appropriate scaling in the quantization stage approximates the 4×4 Discrete Cosine Transform (DCT). The Transform is applied in both horizontal and vertical directions. When a macroblock is encoded as intra 16×16, the DC coefficients of all 16 4×4 blocks are further transformed with a 4×4 Hardamard Transform.

Quantization in H.264 utilizes 52 quantization parameters (QP) that specify 52 different quantization step sizes. A lower QP corresponds to a smaller step size and finer resolution. During the encoding process, the rate controller 401 will adjust a nominal QP level to maintain a specified bit rate profile.

While maintaining the bit rate profile, the rate controller 401 can generate compression parameters such as picture bits (Ta) and picture quantization scale (Qa). The compression parameters generated in one encoder device can be used by another encoder device as estimates for the encoding of a future picture. For example, a first encoding device can be encoding a first GOP that begins with an I picture. The rate controller 401 of the first encoding device can generate compression parameters based on the I picture and pass said compression parameters to a rate controller in a second device. The second encoding device can then encode a second GOP that begins with an I picture. In this example the parallel encoder devices gain the predictive ability of a serial encoding device. After a delay equal to the time it takes to encode one picture, the two parallel encoder devices can process a video stream twice as fast as a single encoding device without loss of quality.

H.264 specifies two types of entropy coding: Context-based Adaptive Binary Arithmetic Coding (CABAC) and Context-based Adaptive Variable-Length Coding (CAVLC). The entropy encoder 413 receives the quantized transform coefficients and produces a video output. In the case of temporal prediction, a set of picture reference indices may be entropy encoded as well.

The quantized transform coefficients are also fed into an inverse transformer/quantizer 415 to produce a regenerated error. The selected prediction and the regenerated error are summed 421 to regenerate a reference picture that is passed through the deblocking filter 417 and used for motion estimation.

FIG. 5 is a flow diagram 500 of another exemplary method for parallel processing video data in accordance with an embodiment of the present invention. In 501, a first set of compression parameters for a first group of pictures is generated. In 503, a second set of compression parameters for a second group of pictures is generated. The generation of the first set of compression parameters and the generation of the second set of compression parameters are simultaneous. In 505, a third group of pictures is encoded based on the first set of compression parameters that are passed forward. The first set of compression parameters comprises a number of picture bits in an I picture that appears in display order prior to the third group of pictures. In 507, a third group of pictures is encoded based on the second set of compression parameters that are passed backward. The second set of compression parameters comprises a number of picture bits in an I picture that appears in display order after to the third group of pictures. The third group of pictures may contain more than one I picture.

The embodiments described herein may be implemented as a board level product, as a single chip, application specific integrated circuit (ASIC), or with individual encoder devices integrated with other portions of the system as separate components. An integrated circuit may store encoded and unencoded video data in memory and use an arithmetic logic to encode, detect, and format the video output.

The degree of integration and the number of encoder devices in the parallel encoder circuit will primarily be determined by the size, speed, and cost considerations. Because of the sophisticated nature of modern processors, it is possible to utilize a commercially available processor, which may be implemented external to an ASIC implementation.

If the processor is available as an ASIC core or logic block, then the commercially available processor can be implemented as part of an ASIC device wherein certain functions can be implemented in firmware as instructions stored in a memory. Alternatively, the functions can be implemented as hardware accelerator units controlled by the processor.

While the present invention has been described with reference to certain embodiments, it will be understood by those skilled in the art that various changes may be made and equivalents may be substituted without departing from the scope of the present invention.

Additionally, many modifications may be made to adapt a particular situation or material to the teachings of the present invention without departing from its scope. For example, although the invention has been described with a particular emphasis on one encoding standard, the invention can be applied to a wide variety of standards.

Therefore, it is intended that the present invention not be limited to the particular embodiment disclosed, but that the present invention will include all embodiments falling within the scope of the appended claims.

The invention claimed is:

1. A method for parallel processing, said method comprising:
generating a first set of compression parameters for a first group of pictures with a first encoder;
generating a second set of compression parameters for a second group of pictures with a second encoder; and
encoding a third group of pictures based on at least one of the first set of compression parameters and the second set of compression parameters with a third encoder.

2. The method of claim 1, wherein the first set of compression parameters and the second set of compression parameters are generated simultaneously.

3. The method of claim 1, wherein the first group of pictures is prior to the third group of pictures in a display order, and wherein the first set of compression parameters are passed forward to be utilized during the encoding of the third group of pictures.

4. The method of claim 3, wherein the first set of compression parameters comprises a number of picture bits in an I picture.

5. The method of claim 1, wherein the second group of pictures is after the third group of pictures in a display order, and wherein the second set of compression parameters are passed backwards to be utilized during the encoding of the third group of pictures.

6. The method of claim 4, wherein the second set of compression parameters comprises a number of picture bits in an I picture.

7. A system for parallel processing, said system comprising:
a first encoder device for generating a first set of compression parameters for a first group of pictures;
a second encoder device for generating a second set of compression parameters for a second group of pictures; and
a third encoder device for encoding a third group of pictures based on at least one of the first set of compression parameters and the second set of compression parameters.

8. The system of claim 7, wherein the first encoder device and the second encoder device are started simultaneously.

9. The system of claim 7, wherein the first group of pictures is prior to the third group of pictures in a display order, and wherein the first set of compression parameters are passed forward from the first encoder device to the third encoder device.

10. The system of claim 9, wherein the first set of compression parameters comprises a number of picture bits in an I picture.

11. The system of claim 7, wherein the second group of pictures is after the third group of pictures in a display order, and wherein the second set of compression parameters are passed backwards from the second encoder device to the third encoder device.

12. The system of claim 10, wherein the second set of compression parameters comprises a number of picture bits in an I picture.

13. A system for parallel processing, said system comprising:
an integrated circuit comprising a plurality of circuits for generating compression parameters and encoding pictures, wherein a first set of compression parameters generated by a first circuit for at least one picture is used by a second circuit during the encoding of at least another pictures; and
a memory for storing the video data.

14. The system of claim 13, wherein compression parameters comprise a number of picture bits in an I picture.

15. The system of claim 13, wherein the first circuit generates the first set of compression parameters at the same time as a second set of compression parameters is generated.

16. The system of claim 13, wherein a first group of pictures is prior to a second group of pictures in a display order, and wherein the first set of compression parameters are passed forward to be utilized by the second circuit during the encoding of video data in said second group of pictures.

17. The system of claim 13, wherein a first group of pictures is after a second group of pictures in a display order, and wherein the first set of compression parameters are passed backward to be utilized by the second circuit during the encoding of video data in said second group of pictures.

18. The method of claim 1, wherein the first group of pictures comprises a first plurality of pictures, wherein the second group comprises a second plurality of pictures, and wherein the third group comprises a third plurality of pictures.

19. The system of claim 7, wherein the first group of pictures comprises a first plurality of pictures, wherein the second group comprises a second plurality of pictures, and wherein the third group comprises a third plurality of pictures.

20. The system of claim 7, wherein the third encoder device is started after the first encoder device and the second encoder device.

21. The system of claim 7, wherein the third encoder device entirely codes the third group of pictures, and
wherein the first encoder device entirely generates the first parameters and wherein the second encoder device entirely generates the second parameters.

22. The system of claim 21, wherein the the first and second encoder devices start simultaneously and wherein the third encoder devices encodes the third group of pictures concurrently with the first and second encoder.

* * * * *